(12) United States Patent
Glöckner et al.

(10) Patent No.: US 7,700,664 B2
(45) Date of Patent: Apr. 20, 2010

(54) POLYMER COMPOSITIONS OF CARBONYL-HYDRATED KETONE-ALDEHYDE RESINS AND POLYISOCYANATES IN REACTIVE SOLVENTS

(75) Inventors: Patrick Glöckner, Haltern am See (DE); Andreas Wenning, Nottuln (DE); Peter Denkinger, Nottuln (DE)

(73) Assignee: Degussa AG, Duesselforf (DE)

( * ) Notice: Subject to any disclaimer, the term of this patent is extended or adjusted under 35 U.S.C. 154(b) by 116 days.

(21) Appl. No.: 11/587,792

(22) PCT Filed: Mar. 4, 2005

(86) PCT No.: PCT/EP2005/050976

§ 371 (c)(1),
(2), (4) Date: Sep. 18, 2007

(87) PCT Pub. No.: WO2005/105882

PCT Pub. Date: Nov. 10, 2005

(65) Prior Publication Data

US 2008/0027156 A1 Jan. 31, 2008

(30) Foreign Application Priority Data

Apr. 27, 2004 (DE) .................. 10 2004 020 740

(51) Int. Cl.
*C08F 2/46* (2006.01)
*C08F 2/50* (2006.01)
*C08J 3/28* (2006.01)
*B32B 9/00* (2006.01)
*B32B 9/04* (2006.01)

(52) U.S. Cl. .................. 522/174; 522/90; 522/97; 522/166; 522/104; 522/105; 522/108; 522/150; 522/151; 522/152; 522/153; 522/173; 522/154; 522/178

(58) Field of Classification Search .................. 522/90, 522/166, 97, 104, 105, 108, 150, 151, 152, 522/153, 154, 173, 174, 178; 525/399; 428/411.1
See application file for complete search history.

(56) References Cited

U.S. PATENT DOCUMENTS

| | | | |
|---|---|---|---|
| 4,205,018 A | | 5/1980 | Nagasawa et al. |
| 5,919,859 A | * | 7/1999 | Ortelt et al. .................. 524/591 |
| 5,981,113 A | * | 11/1999 | Christian .................. 430/9 |
| 6,316,539 B1 | * | 11/2001 | Hobisch et al. ............. 524/542 |
| 6,452,003 B1 | | 9/2002 | Ewald et al. |
| 6,552,154 B1 | | 4/2003 | Kohlstruk et al. |
| 6,613,863 B2 | | 9/2003 | Kohlstruk et al. |
| 6,730,628 B2 | | 5/2004 | Kohlstruk et al. |
| 6,794,482 B2 | | 9/2004 | Glöckner et al. |
| 6,797,787 B2 | | 9/2004 | Scholz et al. |
| 6,800,714 B2 | | 10/2004 | Kohlstruk et al. |
| 6,881,785 B2 | | 4/2005 | Glöckner et al. |
| 7,001,973 B2 | | 2/2006 | Kohlstruk et al. |
| 7,005,002 B2 | | 2/2006 | Glöckner et al. |
| 7,033,522 B2 | | 4/2006 | Jonderko et al. |
| 7,101,958 B2 | | 9/2006 | Glöckner et al. |
| 7,135,522 B2 | | 11/2006 | Glöckner et al. |
| 7,199,166 B2 | * | 4/2007 | Gloeckner et al. ............. 522/94 |
| 2004/0116604 A1 | | 6/2004 | Glöckner et al. |
| 2004/0122172 A1 | | 6/2004 | Glöckner et al. |
| 2005/0010016 A1 | | 1/2005 | Glöckner et al. |
| 2005/0043501 A1 | | 2/2005 | Glöckner et al. |
| 2005/0080222 A1 | | 4/2005 | Andrejewski et al. |
| 2005/0124716 A1 | * | 6/2005 | Gloeckner et al. .......... 522/113 |
| 2005/0124780 A1 | | 6/2005 | Glöckner et al. |
| 2006/0074217 A1 | | 4/2006 | Glöckner et al. |

FOREIGN PATENT DOCUMENTS

| | | |
|---|---|---|
| EP | 1 508 582 | 2/2005 |
| GB | 1 182 884 | 3/1970 |
| WO | 2007/099038 A1 | 9/2007 |
| WO | 2007/141089 A1 | 12/2007 |
| WO | 2007/141090 A1 | 12/2007 |
| WO | 2008/052831 A2 | 8/2008 |

OTHER PUBLICATIONS

U.S. Appl. No. 11/631,392, filed Dec. 29, 2006, Gloeckner, et al.
U.S. Appl. No. 11/632,303, filed Jan. 12, 2007, Andrejewski, et al.
U.S. Appl. No. 11/573,212, filed Feb. 5, 2007, Gloeckner, et al.
U.S. Appl. No. 11/574,113, filed Feb. 22, 2007, Gloeckner, et al.
U.S. Appl. No. 11/574,197, filed Feb. 23, 2007, Gloeckner, et al.
U.S. Appl. No. 11/577,415, filed Apr. 18, 2007, Gloeckner, et al.
U.S. Appl. No. 12/158,800, filed Jun. 23, 2008, Gloeckner, et al.
U.S. Appl. No. 12/159,097, filed Jun. 25, 2008, Gloeckner, et al.
U.S. Appl. No. 12/159,673, filed Jun. 30, 2008, Gloeckner, et al.
U.S. Appl. No. 12/159,906, filed Jul. 2, 2008, Gloeckner, et al.
U.S. Appl. No. 11/577,955, filed Apr. 25, 2007, Gloeckner, et al.
U.S. Appl. No. 11/814,306, filed Jul. 19, 2007, Gloeckner, et al.
U.S. Appl. No. 11/577,139, filed Apr. 12, 2007, Gloeckner, et al.
U.S. Appl. No. 10/586,587, filed Jul. 20, 2006, Gloeckner, et al.
U.S. Appl. No. 10/588,193, filed Aug. 2, 2006, Gloeckner, et al.
U.S. Appl. No. 11/917,104, filed Dec. 10, 2007, Vey, et al.
U.S. Appl. No. 11/909,098, filed Sep. 19, 2007, Spyrou, et al.
U.S. Appl. No. 11/911,394, filed Oct. 12, 2007, Becker, et al.

* cited by examiner

*Primary Examiner*—Sanza L McClendon
(74) *Attorney, Agent, or Firm*—Oblon, Spivak, McClelland, Maier & Neustadt, L.L.P.

(57) ABSTRACT

The invention relates to polymer compositions of carbonyl-hydrogenated ketone-aldehyde resins and polyisocyanates in reactive solvents, to a process for their preparation and to the use, particularly in radiation-curable coating materials and adhesives.

30 Claims, No Drawings

POLYMER COMPOSITIONS OF CARBONYL-HYDRATED KETONE-ALDEHYDE RESINS AND POLYISOCYANATES IN REACTIVE SOLVENTS

The invention relates to polymer compositions of carbonyl-hydrogenated ketone-aldehyde resins and polyisocyanates in reactive solvents, to a process for their preparation and to the use, particularly in radiation-curable coating materials and adhesives.

Radiation-curable coating materials have increasingly gained in importance within recent years, for reasons including the low VOC (volatile organic compounds) content of these systems.

The film-forming components in the coating material are of relatively low molecular mass and hence of low viscosity, so that there is no need for high fractions of organic solvents. Durable coatings are obtained by the formation, following application of the coating material, of a high molecular mass, polymeric network by means of crosslinking reactions initiated by, for example, UV light. Formation of the network results in volume contraction, which is said in the literature to be a reason for the sometimes poor adhesion of radiation-curable coating materials to different substrates [Surface Coatings International Part A, 2003/06, pp. 221-228].

Ketone-aldehyde resins are used in coating materials, for example as film-forming additive resins, in order to enhance certain properties such as initial drying rate, gloss, hardness or scratch resistance. Owing to their relatively low molecular weight, customary ketone-aldehyde resins possess a low melt viscosity and solution viscosity and therefore also serve as film-forming functional fillers in coating materials.

DE 23 45 624, EP 736 074, DE 28 47 796, DD 24 0318, DE 24 38 724 and JP 09143396 describe the use of ketone-aldehyde resins and ketone resins, e.g., cyclohexanone-formaldehyde resins, in radiation-curable systems.

EP 902 065 describes the use of resins formed from urea (derivatives), ketones or aldehydes as an additional component in a mixture with radiation-curable resins.

DE 24 38 712 describes radiation-curing printing inks composed of film-forming resins, ketone resins and ketone-formaldehyde resins, and also polymerizable components such as polyfunctional acrylate esters of polyhydric alcohols.

U.S. Pat. No. 4,070,500 describes the use of non-radiation-curable ketone-formaldehyde resins as a film-forming component in radiation-curable inks.

A common feature of the products of the publications mentioned is that they carry carbonyl groups. As a result of irradiation, for example, carbonyl groups are subject to conventional degradation reactions such as those of Norrish type I or II [Laue, Plagens, Namen und Schlagwort-Reaktionen, Teubner Studienbücher, Stuttgart, 1995].

The use of unmodified ketone-aldehyde or ketone resins is therefore not possible for high-quality applications in the exterior sector, for example, where high properties of resistance particularly to weathering and heat are necessary.

These properties are improved by converting the carbonyl groups into secondary alcohol groups by hydrogenating ketone-aldehyde resins. This has long been practiced (DE-C 8 70 022). A typical and known product is Kunstharz SK from Degussa AG. The use of carbonyl-hydrogenated and also ring-hydrogenated ketone-aldehyde resins based on aromatic ketones is likewise possible. One such resin is described in DE 33 34 631. The OH number of such products, at more than 200 mg KOH/g, is very high.

Carbonyl-hydrogenated ketone-aldehyde resins which can be crosslinked under induction by radiation are described in DE application 103 38 562.2 and 103 38 560.6. Because of the relatively low molecular weight these resins possess a comparatively low melting range of between 90 and 140° C. Particularly in the case of pigmented coating materials or else in shadow regions of three-dimensional substrates, however, a high softening range is desirable, since it allows a tack-free state to be obtained at a relatively low degree of crosslinking.

It was an object of the present invention to find polymer compositions suitable for use as adhesion promoters in radiation-curable adhesives and coating materials.

Surprisingly it has proven possible to achieve this object by using, in radiation-curable coating materials, polymer compositions which are in solution in a radiation-reactive solvent and which are composed of the reaction products of carbonyl-hydrogenated ketone-aldehyde resins and diisocyanates or polyisocyanates having a melting range of more than 140° C.

As polymer compositions in this case carbonyl-hydrogenated ketone-aldehyde resins were modified chemically by adding a radiation-reactive solvent such as to result in inherently radiation-inert resins, i.e., non-crosslinkable and storage-stable resins, in a radiation-reactive solvent. The carbonyl-hydrogenated ketone-aldehyde resins, moreover, are stable to hydrolysis and resistant to chemicals, and possess a high yellowing resistance. In radiation-induced crosslinkable coating materials or adhesives the polymer compositions produce good adhesion to different substrates such as, for example, metals and plastics such as polyethylene, polypropylene or polycarbonate, for example, in conjunction with a high level of hardness.

The invention provides polymer compositions essentially comprising

A) at least one radiation-reactive solvent and the reaction product, with a melting range of more than 140° C., of B) at least one carbonyl-hydrogenated ketone-aldehyde resin with C) at least one aromatic, aliphatic and/or cycloaliphatic diisocyanate or polyisocyanate.

The invention also provides for the use of polymer compositions essentially comprising A) at least one radiation-reactive solvent and the reaction product, with a melting range of more than 140° C., of B) at least one carbonyl-hydrogenated ketone-aldehyde resin with C) at least one aromatic, aliphatic and/or cycloaliphatic diisocyanate or polyisocyanate as a main component, base component or additional component in, in particular, radiation-curing coating materials, adhesives, inks, including printing inks, polishes, varnishes, pigment pastes, filling compounds, cosmetic articles and/or sealants and insulants, particularly for improving the adhesion properties and the hardness.

As component A) it is possible in principle to use any compounds which are liquid at room temperature and possess unsaturated moieties that are amenable to the free-radical crosslinking reaction.

Solvents which can be used with preference as component A) are acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2-epoxybutyl methacrylate, 2,3-epoxycyclopentyl acrylate, 2,3-epoxycyclopentyl methacrylate and also the analogous amides, it being possible for styrene and/or its derivatives to be present as well.

Particular preference is given to phenoxyethyl acrylate, ethoxyethoxyethyl acrylate, isodecyl acrylate and isobornyl acrylate.

Another preferred class of radiation-reactive solvents for use as component A) are di-, tri- and/or tetraacrylates and their methacrylic analogs, arising formally from the reaction products of acrylic acid and/or methacrylic acid and an alcohol component with elimination of water. As an alcohol component customary for this purpose use is made, for example, of ethylene glycol, 1,2- and 1,3-propanediol, diethylene glycol, dipropylene and tripropylene glycol, triethylene glycol, tetraethylene glycol, 1,2- and 1,4-butanediol, 1,3-butylethylpropanediol, 1,3-methylpropanediol, 1,5-pentanediol, 1,4-bis(hydroxymethyl)cyclohexane (cyclohexanedimethanol), glycerol, hexanediol, neopentyl glycol, trimethylolethane, trimethylolpropane, pentaerythritol, bisphenol A, B, C, F, norbornylene glycol, 1,4-benzyldimethanol and -ethanol, 2,4-dimethyl-2-ethylhexane-1,3-diol, 1,4- and 2,3-butylene glycol, di-β-hydroxyethylbutanediol, 1,5-pentanediol, 1,6-hexanediol, 1,8-octanediol, decanediol, dodecanediol, cyclohexanediol, trimethylolpropane, 3(4),8(9)-bis(hydroxymethyl)tricyclo[5.2.1.0$^{2,6}$]decane (Dicidol), 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, hexane-1,2,6-triol, butane-1,2,4-triol, tris(β-hydroxyethyl)isocyanurate, mannitol, sorbitol, polypropylene glycols, polybutylene glycols, xylylene glycol or neopentyl glycol hydroxypivalate, alone or in mixtures.

Particular preference, however, is given to dipropylene glycol diacrylate (DPGDA) and/or tripropylene glycol diacrylate (TPGDA), hexanediol diacrylate (HDDA) or trimethylolpropane triacrylate, alone or in a mixture.

In general, however, it is possible to use all of the reactive diluents said to be suitable in the literature for radiation-curable coating materials.

Suitable ketones for preparing the carbonyl-hydrogenated ketone-aldehyde resins (component B)) include all ketones, especially acetone, acetophenone, 4-tert-butyl methyl ketone, methyl ethyl ketone, heptan-2-one, pentan-3-one, methyl isobutyl ketone, cyclopentanone, cyclododecanone, mixtures of 2,2,4- and 2,4,4-trimethylcyclopentanone, cycloheptanone and cyclooctanone, cyclohexanone and all alkyl-substituted cyclohexanones having one or more alkyl radicals containing in total 1 to 8 carbon atoms, individually or in a mixture. Examples that may be mentioned of alkyl-substituted cyclohexanones include 4-tert-amylcyclohexanone, 2-sec-butylcyclohexanone, 2-tert-butylcyclohexanone, 4-tert-butylcyclohexanone, 2-methylcyclohexanone and 3,3,5-trimethylcyclohexanone.

In general, however, all of the ketones said in the literature to be suitable for ketone resins syntheses, more generally all C—H-acidic ketones, may be used. Preference is given to carbonyl-hydrogenated ketone-aldehyde resins based on the ketones acetophenone, 4-tert-butyl methyl ketone, cyclohexanone, 4-tert-butylcyclohexanone, 3,3,5-trimethylcyclohexanone and heptanone, alone or in a mixture.

Suitable aldehyde components of the carbonyl-hydrogenated ketone-aldehyde resins (component B)) include in principle linear or branched aldehydes, such as formaldehyde, acetaldehyde, n-butyraldehyde and/or isobutyraldehyde, valeraldehyde, and also dodecanal. In general it is possible to use all of the aldehydes said in the literature to be suitable for ketone resin syntheses. It is preferred, however, to use formaldehyde, alone or in mixtures.

The required formaldehyde is normally used in the form of an aqueous or alcoholic (e.g., methanol or butanol) solution with a strength of from about 20% to 40% by weight. Other forms of formaldehyde, such as para-formaldehyde or trioxane, for example, are likewise possible for use. Aromatic aldehydes, such as benzaldehyde, for example, can likewise be present in the mixture with formaldehyde.

Particularly preferred starting compounds used for component B) are carbonyl-hydrogenated resins of acetophenone, 4-tert-butyl methyl ketone, cyclohexanone, 4-tert-butylcyclohexanone, 3,3,5-trimethylcyclohexanone and heptanone, alone or in a mixture, and formaldehyde.

The resins of ketone and aldehyde are hydrogenated in the presence of a catalyst with hydrogen at pressures of up to 300 bar. In the course of the hydrogenation the carbonyl group of the ketone-aldehyde resin is converted into a secondary hydroxyl group. Depending on reaction conditions, some of the hydroxyl groups may be eliminated, resulting in methylene groups. This is illustrated in the following scheme:

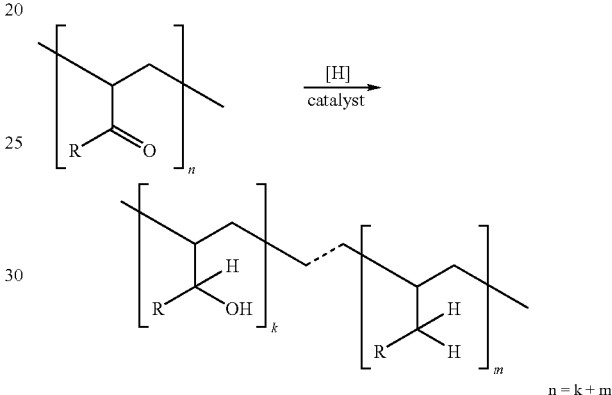

Suitable components C) are aromatic, aliphatic and/or cycloaliphatic diisocyanates and/or polyisocyanates.

Examples of diisocyanates are cyclohexane diisocyanate, methylcyclohexane diisocyanate, ethylcyclohexane diisocyanate, phenylene diisocyanate, propylcyclohexane diisocyanate, methyldiethylcyclohexane diisocyanate, tolylene diisocyanate, bis(isocyanatophenyl)methane, propane diisocyanate, butane diisocyanate, pentane diisocyanate, hexane diisocyanate, such as hexamethylene diisocyanate (HDI) or 1,5-diisocyanato-2-methylpentane (MPDI), heptane diisocyanate, octane diisocyanate, nonane diisocyanate, such as 1,6-diisocyanato-2,4,4-trimethylhexane or 1,6-diisocyanato-2,2,4-trimethylhexane (TMDI), nonane triisocyanate, such as 4-isocyanatomethyl-1,8-octane diisocyanate (TIN), decane di- and tri-isocyanate, undecane di- and tri-isocyanate, dodecane di- and tri-isocyanate, isophorone diisocyanate (IPDI), bis(isocyanatomethylcyclohexyl)methane (H$_{12}$MDI), isocyanatomethyl-methylcyclohexyl isocyanate, 2,5(2,6)-bis(isocyanatomethyl)bicyclo[2.2.1]heptane (NBDI), 1,3-bis(isocyanatomethyl)cyclohexane (1,3-H$_6$-XDI) or 1,4-bis(isocyanatomethyl)cyclohexane (1,4-H$_6$-XDI), alone or in a mixture.

Another preferred class of polyisocyanates as component C) are the compounds having more than two isocyanate groups per molecule that are prepared by dimerizing, trimerizing, allophanatizing, biuretizing and/or urethanizing the simple diisocyanates, examples being the reaction products of these simple diisocyanates, such as IPDI, TMDI, HDI and/or H$_{12}$MDI, for example, with polyhydric alcohols (e.g., glycerol, trimethylolpropane, pentaerythritol) and/or polyfunctional polyamines, or else the triisocyanurates obtainable by trimerizing the simple diisocyanates such as IPDI, HDI and $H_{12}MDI$, for example.

If desired it is possible to use a suitable catalyst to prepare the resins from B+C. Suitable compounds are all those known in the literature which accelerate an OH—NCO reaction, such as diazabicyclooctane (DABCO) or dibutyltin dilaurate (DBTL), for example.

It is also possible to replace a part of the carbonyl-hydrogenated ketone-aldehyde resins B) by further hydroxy-functional polymers D) such as, for example, hydroxy-functional polyethers, nonhydrogenated and/or ring-hydrogenated phenol-aldehyde resins, polyesters and/or polyacrylates. In this case it is possible directly to carry out polymer-analogous reaction of mixtures of these polymers D) and component B) with component C). In contrast to the "straight" carbonyl-hydrogenated ketone-aldehyde resins B) it is possible by this means to set properties such as flexibility and hardness, for example, even more effectively. The further hydroxy-functional polymers generally possess molecular weights $M_n$ of between 200 and 10 000 g/mol, preferably between 300 and 5000 g/mol.

The melting range of the reaction product of B) and C) is above 140° C., preferably above 145° C., more preferably above 150° C.

The amounts of B) and C) are chosen such that 1 mol of the carbonyl-hydrogenated ketone-aldehyde resin (component B), based on $M_n$, and from 0.2 to 15 mol, preferably from 0.25 to 10 mol, especially from 0.3 to 4 mol, of components C) are used.

The amount of A) and of the reaction product of B) and C) and optionally D) is chosen such that the mass fraction of this reaction product of B), C) and optionally D) is between 99 and 1%, preferably between 90 and 20% and more preferably between 80 and 25%.

The invention additionally provides a process for preparing polymer compositions essentially comprising
A) at least one radiation-reactive solvent and the reaction product, with a melting range of more than 140° C., of
B) at least one carbonyl-hydrogenated ketone-aldehyde resin with
C) at least one aromatic, aliphatic and/or cycloaliphatic diisocyanate or polyisocyanate and optionally
D) at least one further hydroxy-functionalized polymer, by reacting B) and C) in A) at temperatures from 20 to 150° C.

In one preferred preparation process I component C), optionally in the presence of a suitable catalyst, is added to the solution of the carbonyl-hydrogenated ketone-aldehyde resin B) in the reactive diluent A).

The temperature of the reaction is chosen in accordance with the reactivity of component C). Temperatures of between 30 and 150° C., preferably between 50 and 140° C., have proven appropriate. The reaction also takes place, albeit less preferably, at room temperature.

It has proven advantageous to react 1 mol of the carbonyl-hydrogenated ketone-aldehyde resin—based on $M_n$—with from 0.2 to 15 mol, preferably from 0.25 to 10 mol, especially from 0.3 to 4 mol of the isocyanate component C).

In one preferred preparation process II component C), optionally in the presence of a suitable catalyst, is added to the solution of the carbonyl-hydrogenated ketone-aldehyde resin B) in the reactive diluent A) and in the hydroxy-functional polymer (component D)), such as, for example, polyethers, non-hydrogenated and/or ring-hydrogenated phenol-aldehyde resins, polyesters and/or polyacrylate.

The temperature of the reaction is chosen in accordance with the reactivity of component C). Temperatures of between 30 and 150° C., preferably between 50 and 140° C., have proven appropriate. It is also possible to allow the reaction to take place, albeit less preferably, at room temperature.

It has proven advantageous to react 1 mol of component A) and/or additional polymers, based on $M_n$, with from 0.2 to 15 mol, preferably from 0.25 to 10 mol, especially from 0.3 to 4 mol of component C).

The examples which follow are intended to illustrate the invention made, but not to restrict its scope of application:

EXAMPLE 1

Synthesis takes place by reacting 400 g of Kunstharz SK (Degussa AG; hydrogenated resin of acetophenone and formaldehyde, OHN=240 mg KOH/g (acetic hydride method), Mn ~1000 g/mol (GPC against polystyrene as standard), melting range 114-120° C.) with 90 g of Vestanat IPDI (Degussa AG) in the presence of 0.2% (on resin) of 2,6-bis(tert-butyl)-4-methylphenol (Ralox BHT, Degussa AG) and 0.1% of dibutyltin dilaurate (on resin, 65% in TPGDA) in 40% dilution with TPGDA in a three-necked flask with stirrer, reflux condenser and temperature sensor at 80° C. under a nitrogen atmosphere until an NCO number of less than 0.1 is reached. This gives a pale, clear solution having a dynamic viscosity of 8.85 Pa·s. The Gardner color number of the solution is 0.3. After storage at 60° C. for 14 days the Gardner color number is 0.6, which for resins of this kind corresponds to high yellowing resistance.

EXAMPLE 2 FOR DETERMINING THE MELTING RANGE

Synthesis takes place by reacting 400 g of Kunstharz SK (Degussa AG; hydrogenated resin of acetophenone and formaldehyde, OHN=240 mg KOH/g (acetic hydride method), Mn ~1000 g/mol (GPC against polystyrene as standard), melting range 114-120° C.) with 90 g of Vestanat IPDI (Degussa AG) in the presence of 0.2% (on resin) of 2,6-bis(tert-butyl)-4-methylphenol (Ralox BHT, Degussa AG) and 0.1% of dibutyltin dilaurate (on resin, 65% in acetone) in 40% dilution with acetone in a three-necked flask with stirrer, reflux condenser and temperature sensor under reflux under a nitrogen atmosphere until an NCO number of less than 0.1 is reached. Removal of the acetone gives a colorless powder possessing a melting range of from 171 to 176° C.

USE EXAMPLES

The base resin (UV 20) used was an adduct of trimethylolpropane, IPDI, Terathane 650 and hydroxyethyl acrylate, as a 70% strength solution in TPGDA, viscosity at 23° C.=20.9 Pas. For comparison, Kunstharz SK was investigated.

| Coating material | A | B | C |
|---|---|---|---|
| UV 20 | 100 | 60 | 60 |
| Kunstharz SK | — | 40 | — |
| Resin from Example 2 | — | — | 100 |
| TPGDA | 40 | 64 | 4 |

Resin solutions A, B and C were admixed with Darocur 1173 (Ciba Specialty Chemicals, 1.5% based on resin solids) and drawn down onto a glass plate using a doctor blade. The films were then cured using UV light (medium-pressure mercury lamp, 70 W/optical filter 350 nm) for approximately 16 seconds. The films, soluble beforehand, are no longer soluble in methyl ethyl ketone.

| Coating material | FT [μ] | EC [mm] | HK [s] | Peugeot Test | MEK test [double rubs] | Flow |
|---|---|---|---|---|---|---|
| A | 30-37 | 7 | 115 | ++ | >150 | Minimally restless surface |
| B | 30-33 | 6 | 163 | ++ | >150 | Good flow |
| C | 30-36 | 6.5 | 192 | ++ | >150 | Good flow |

Cross-Hatch Testing on Different Substrates

| Coating material | ABS | PC | PE | PP | PS | Metal |
|---|---|---|---|---|---|---|
| A | 1 | 4 | 4 | 5 | 4 | 2 |
| B | 0 | 1 | 4 | 4 | 4 | 0 |
| C | 0 | 0 | 3 | 3 | 1 | 0 |

0 = no delamination;
5 = complete loss of adhesion

ABBREVIATIONS

ABS: Acrylonitrile-butadiene-styrene copolymer X
EC: Erichsen cupping
HK: König pendulum hardness
MEK test: Resistance to butanone
PC: Polycarbonate
PE: Polyethylene
Peugeot test: Premium-grade gasoline resistance
PP: Polypropylene
PS: Polystyrene
FT: Film thickness

What is claimed is:

1. A polymer composition comprising
    A) at least one radiation-reactive solvent and the reaction product of
    B) at least one carbonyl-hydrogenated ketone-aldehyde resin with
    C) at least one aromatic, aliphatic and/or cycloaliphatic diisocyanate or polyisocyanate, said reaction product having a melting range of more than 140° C.
2. A polymer composition comprising
    A) at least one radiation-reactive solvent and the reaction product of
    B) at least one carbonyl-hydrogenated ketone-aldehyde resin with
    C) at least one aromatic, aliphatic and/or cycloaliphatic diisocyanate or polyisocyanate and optionally
    D) at least one hydroxy-functionalized polymer.
3. The polymer composition as claimed in claim 1, wherein compounds containing unsaturated moieties are used as component A).
4. The polymer composition as claimed in claim 1, wherein component A) is selected from the group consisting of acrylic acid and/or methacrylic acid, $C_1$-$C_{40}$ alkyl esters and/or cycloalkyl esters of methacrylic acid and/or acrylic acid, glycidyl methacrylate, glycidyl acrylate, 1,2-epoxybutyl acrylate, 1,2 epoxybutyl methacrylate, 2,3-epoxycyclopentyl acrylate, 2,3-epoxycyclopentyl methacrylate and also the analogous amides and/or styrene and/or their derivatives, alone or in mixtures.
5. The polymer composition as claimed in claim 1, wherein component A) is selected from the group consisting of phenoxyethyl acrylate, ethoxyethoxyethyl acrylate, isodecyl acrylate and isobornyl acrylate, alone or in mixtures.
6. The polymer composition as claimed in claim 1, wherein di-, tri- and/or tetra-acrylates or their methacrylate analogs, alone or in mixtures, are present as component A).
7. The polymer composition as claimed in claim 6, wherein component A) is selected from the group consisting of di, tri and/or tetra-acrylates and their methacrylate analogs of ethylene glycol, 1,2- and 1,3-propanediol, diethylene glycol, dipropylene and tripropylene glycol, triethylene glycol, tetraethylene glycol, 1,2-and 1,4-butanediol, 1,3-butylethylpropanediol, 1,3 methylpropanediol, 1,5-pentanediol, 1,4-bis(hydroxymethyl)cyclohexane(cyclohexanedimethanol), glycerol, hexanediol, neopentyl glycol, trimethylolethane, trimethylolpropane, pentaerythritol, bisphenol A, B, C, F, norbornylene glycol, 1,4-benzyldimethanol and -ethanol, 2,4-dimethyl-2-ethylhexane-1,3-diol, 1,4- and 2,3-butylene glycol, di- β-hydroxyethylbutanediol, 1,5-pentanediol, 1,6-hexanediol, 1,8-octanediol, decanediol, dodecanediol, cyclohexanediol, trimethylolpropane, 3(4),8(9)-bis(hydroxymethyl)tricyclo[5.2.1.0$^{2,6}$]decane (Dicidol), 2,2-bis(4-hydroxycyclohexyl)propane, 2,2-bis[4-(β-hydroxyethoxy)phenyl]propane, 2-methylpropane-1,3-diol, 2-methylpentane-1,5-diol, 2,2,4(2,4,4)-trimethylhexane-1,6-diol, hexane 1,2,6-triol, butane 1,2,4-triol, tris(β-hydroxyethyl)isocyanurate, mannitol, sorbitol, polypropylene glycols, polybutylene glycols, xylylene glycol and neopentyl glycol hydroxypivalate, alone or in mixtures.
8. The polymer composition as claimed in claim 6, comprising dipropylene and/or tripropylene glycol diacrylate, hexanediol diacrylate, and trimethylolpropane triacrylate, alone or in a mixture, as component A).
9. The polymer composition as claimed in claim 1, wherein C—H-acidic ketones are used in component B).
10. The polymer composition as claimed in claim 1, wherein ketones selected from the group consisting of acetone, acetophenone, 4-tert-butyl methyl ketone, methyl ethyl ketone, heptan-2-one, pentan-3-one, methyl isobutyl ketone, cyclopentanone, cyclododecanone, mixtures of 2,2,4- and 2,4,4-trimethylcyclopentanone, cycloheptanone, cyclooctanone, cyclohexanone, alone or in mixtures, are used as starting compounds in the carbonyl-hydrogenated ketone-aldehyde resins of component B).
11. The polymer composition as claimed in claim 1, wherein alkyl-substituted cyclohexanones having one or more alkyl radicals containing in total 1 to 8 carbon atoms, individually or in a mixture, are used as starting compounds in the carbonyl-hydrogenated ketone-aldehyde resins of component B).
12. The polymer composition as claimed in claim 11, wherein 4-tert-amylcyclohexanone, 2-sec-butylcyclohexanone, 2-tert-butylcyclohexanone, 4 tert-butylcyclohexanone, 2-methylcyclohexanone and/or 3,3,5-trimethylcyclohexanone are used as starting compounds in the carbonyl-hydrogenated ketone-aldehyde resins of component B).
13. The polymer composition as claimed in claim 1, wherein cyclohexanone, 4-tert-butylcyclohexanone, 3,3,5-trimethylcyclohexanone and heptanone, alone or in a mixture, are used as starting compounds in the carbonyl-hydrogenated ketone-aldehyde resins of component B).
14. The polymer composition as claimed in claim 1, wherein formaldehyde, acetaldehyde, n-butyraldehyde and/or isobutyraldehyde, valeraldehyde, dodecanal, alone or in mixtures, are used as the aldehyde component of the carbonyl-hydrogenated ketone-aldehyde resins in component B).
15. The polymer composition as claimed in claim 14, wherein formaldehyde and/or para-formaldehyde and/or trioxane are used as the aldehyde component of the carbonyl-hydrogenated ketone-aldehyde resins in component B).

16. The polymer composition as claimed in claim 1, wherein carbonyl hydrogenation products of the resins of acetophenone, 4-tert-butyl methyl ketone, cyclohexanone, 4-tert-butylcyclohexanone, 3,3,5-trimethylcyclohexanone, heptanone, alone or in a mixture, and formaldehyde are used as component B).

17. The polymer composition as claimed in claim 1, wherein the component C) diisocyanates are selected from the group consisting of cyclohexane diisocyanate, methylcyclohexane diisocyanate, ethylcyclohexane diisocyanate, phenylene diisocyanate, propylcyclohexane diisocyanate, methyldiethylcyclohexane diisocyanate, toluylene diisocyanate, bis(isocyanatophenyl)methane, propane diisocyanate, butane diisocyanate, pentane diisocyanate, hexane diisocyanate, hexamethylene diisocyanate (HDI), 1,5-diisocyanato-2-methylpentane (MPDI), heptane diisocyanate, octane diisocyanate, nonane diisocyanate, 1,6-diisocyanato-2,4,4-trimethylhexane, 1,6-diisocyanato-2,2,4-trimethylhexane (TMDI), nonane triisocyanate, 4-isocyanatomethyl-1,8-octane diisocyanate (TIN), decane di- and tri-isocyanate, undecane di- and tri-isocyanate, dodecane di- and tri-isocyanate, isophorone diisocyanate (IPDI), bis(isocyanatomethylcyclohexyl)methane ($H_{12}$MDI), isocyanatomethylmethylcyclohexyl isocyanate, 2,5(2,6)-bis(isocyanatomethyl)bicycle[2.2.1]heptane (NBDI), 1,3-bis(isocyanatomethyl)cyclohexane (1,3-$H_6$-XDI) and 1,4-bis(isocyanatomethyl)cyclohexane (1,4-$H_6$-XDI), alone or in mixtures.

18. The polymer composition as claimed in claim 1, wherein polyisocyanates prepared by dimerizing, trimerizing, allophanatizing, biuretizing and/or urethanizing simple diisocyanates are used as component C).

19. The polymer composition as claimed in claim 1, wherein isocyanates based on IPDI, TMDI, $H_{12}$MDI and/or HDI are used as component C).

20. The polymer composition as claimed in claim 1, wherein 1 mol of the carbonyl-hydrogenated ketone-aldehyde resin, based on Mn, and from 0.2 to 15 mol of component C) are used.

21. The polymer composition as claimed in claim 2, wherein the mass fraction of the reaction product of components B), C) and optionally D) is between 99 and 1%.

22. The polymer composition as claimed in claim 2, wherein the melting range of the reaction product of B) and C) is more than 140° C.

23. The polymer composition as claimed in claim 2, wherein component D) is present, and wherein polyethers, polyesters, polyacrylates and/or non-hydrogenated and/or ring-hydrogenated phenol-aldehyde resins are used as hydroxy-functionalized polymers D).

24. The polymer composition as claimed in claim 2, wherein mixtures of the polymers D) and the ketone-aldehyde resins B) are reacted polymer analogously with component C).

25. A process for preparing a polymer composition comprising
   A) at least one radiation-reactive solvent and the reaction product of
   B) at least one carbonyl-hydrogenated ketone-aldehyde resin with
   C) at least one aromatic, aliphatic and/or cycloaliphatic diisocyanate or polyisocyanate, said reaction product having a melting range of more than 140° C., and optionally
   D) at least one hydroxy-functionalized polymer,
   comprising reacting B) and C) in A) at temperatures from 20 to 150° C.

26. The process for preparing a polymer composition as claimed in claim 25, wherein a catalyst is used.

27. The process for preparing a polymer composition as claimed in claim 25, wherein component C), optionally in the presence of a suitable catalyst, is added to the solution of the ketone-aldehyde resins B) in A).

28. The process for preparing a polymer composition as claimed in claim 25, wherein component C), optionally in the presence of a suitable catalyst, is added to the solution of the ketone-aldehyde resins B) in A) and the hydroxy-functional polymer D).

29. The process for preparing a polymer composition as claimed in claim 25, wherein the reaction is carried out at temperatures between 30 and 150° C.

30. A method comprising using the polymer composition as claimed in claim 1, as a main component, base component or additional component in at least one of coating materials, adhesives, inks, printing inks, polishes, varnishes, pigment pastes, filling compounds, cosmetic articles and/or sealants and insulants.

* * * * *